United States Patent [19]
Kroon et al.

[11] Patent Number: 5,311,978
[45] Date of Patent: May 17, 1994

[54] LOADING APPARATUS

[75] Inventors: Frits Kroon, Nijverdal; Martin Stroop, Almelo, both of Netherlands

[73] Assignee: Machinefabriek "CSW" B.V., Deventer, Netherlands

[21] Appl. No.: 946,860

[22] Filed: Sep. 17, 1992

[30] Foreign Application Priority Data

Apr. 3, 1992 [EP] European Pat. Off. ........ 92200965.9

[51] Int. Cl.$^5$ ............................................. B65G 47/91
[52] U.S. Cl. .................................................. 198/428
[58] Field of Search ................... 198/428, 430, 740; 414/626, 627, 744.2, 744.6, 793, 793.1

[56] References Cited

U.S. PATENT DOCUMENTS

| | | | |
|---|---|---|---|
| 2,071,859 | 2/1937 | Steiner | 198/32 |
| 2,619,237 | 11/1952 | Socke | 214/1 |
| 3,033,604 | 5/1962 | Ammon | 294/64 |
| 3,072,252 | 1/1963 | Moreland et al. | 209/80 |
| 3,360,102 | 12/1967 | Cummings | 198/428 |
| 3,601,243 | 8/1971 | Gurgacz | 198/430 |
| 3,776,342 | 12/1973 | Kulig et al. | 198/20 R |
| 3,805,943 | 4/1974 | Warren | 414/416 X |
| 4,039,073 | 8/1977 | Ohlhaver | 198/740 X |
| 4,081,073 | 3/1978 | Zappia | 198/430 |
| 5,044,488 | 9/1991 | Bolin | 198/430 |

FOREIGN PATENT DOCUMENTS

| | | | |
|---|---|---|---|
| 805995 | 6/1951 | Fed. Rep. of Germany | 80A/47/30 |
| 2733823 | 2/1979 | Fed. Rep. of Germany | 198/430 |
| 163068 | 4/1958 | Sweden | 198/428 |
| 1434858 | 5/1976 | United Kingdom | B65G 47/82 |

Primary Examiner—Michael S. Huppert
Assistant Examiner—Stephen Gordon
Attorney, Agent, or Firm—Willian Brinks Hofer Gilson & Lione

[57] ABSTRACT

The invention provides an apparatus for supplying in at least one substantially continuous row onto a first conveyor belt products, particularly beaker-shaped articles open at the top such as metal cans, whereof at least the outer surface of the body is provided with a still wet lacquer layer, and transferring these products onto a second conveyor belt extending transversely of the first conveyor belt, which apparatus includes a pick-up device for picking up products in successive groups from the first conveyor belt, displacing the products parallel to themselves and depositing these groups of products in rows extending transversely of the direction of the second conveyor belt, which pick-up device is equipped for gripping the products from the top, wherein the speed of the pick-up device relative to the first and second conveyor belts is substantially zero during respectively picking up and depositing of the products.

11 Claims, 3 Drawing Sheets

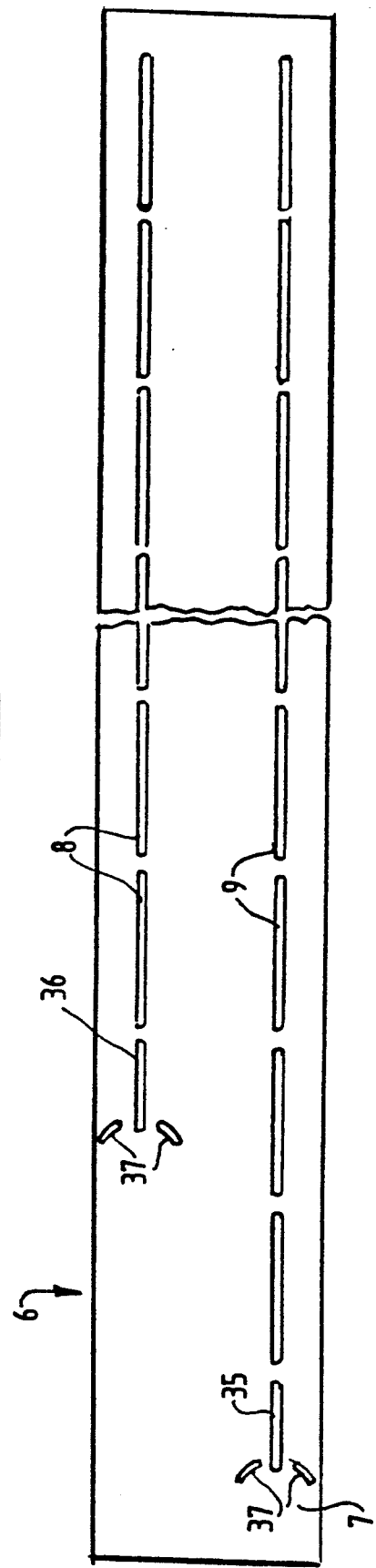

LOADING APPARATUS

To transfer products from a conveyor belt to a second conveyor belt lying transversely thereof use is usually made of pusher members. Such pusher members can transfer the products or groups of products in sideways direction from the first conveyor belt onto the second conveyor belt. A problem arises however if these products may not be touched on their sides. This is for instance the case in the situation where the products are lacquered metal cans which have to be placed in an oven for the purpose of drying the lacquer therein.

The invention provides for this purpose an apparatus for supplying in at least one substantially continuous row onto a first conveyor belt products, particularly beakershaped articles open at the top such as metal cans, whereof at least the outer surface of the body is provided with a still wet lacquer layer, and transferring these products onto a second conveyor belt extending transversely of the first conveyor belt, which apparatus comprises pick-up means for picking up products in successive groups from the first conveyor belt, displacing said products parallel to themselves and depositing these groups of products in rows extending transversely of the direction of the second conveyor belt, which pick-up means are equipped for gripping the products from the top, wherein the speed of the pick-up means relative to the first and second conveyor belts is substantially zero during respectively picking up and depositing of the products.

In particular this apparatus can be embodied such that the pick-up means comprise selectively energizable lifting means for lifting product from the first conveyor belt and depositing said products onto the second conveyor belt.

The lifting means can be of electromagnetic type for handling products which consist at least partly of ferromagnetic material. Aluminium cans however cannot be handled with such an apparatus. In order to make an apparatus universally applicable the embodiment is therefore recommended in which the pick-up means comprise a sole with at least one opening connected to a source of underpressure for picking up the products by suction, which source of underpressure can be controlled for picking up the products by suction in the region of the first conveyor belt, maintaining this suction during transfer of these products and terminating this suction in the region of the second conveyor belt.

It will be apparent that a sole grips only on the upper rim of the products, in particular metal cans, which is not lacquered and not sensitive to contact.

In preference the apparatus is embodied such that the pick-up means are driven by drive means in a generally droplet-shaped path having a portion with maximal displacement speed substantially parallel to the first conveyor belt for picking up products therefrom, and a portion where the speed reverses direction substantially parallel to the second conveyor belt for depositing products thereon. With such an embodiment is achieved that pick-up of the products from the first conveyor belt and depositing thereof on the second conveyor belt takes place very fluently and without disturbance.

A great simplicity is achieved in the mechanical construction of the apparatus with an embodiment in which the active parts of the first and second conveyor belt lie in the same horizontal plane and the pick-up means are only displaceable in a plane parallel thereto at a small height above the products.

In the above described embodiment in which the pick-up means comprise a sole with a suction opening the apparatus can with advantage have the special feature that the opening is embodied as a row of holes.

A great reliability in picking up the products is ensured with an embodiment in which the opening has on its side facing the feed side of the products a shape corresponding with the shape of the downstream side of the upper part of the products. This embodiment has the great advantage of either gripping or not gripping the last product in the group with a great change accuracy, wherein the uncertainty interval is reduced to negligible proportions.

Particularly for handling cylindrical cans this variant may have the feature that the opening comprises at least one straight slotted hole which co-acts with a slotted hole having substantially the same radius of curvature as the cans.

A specific embodiment has the feature that the first conveyor belt supplies the products in two rows and that the pick-up means are equipped for simultaneously picking up two groups, wherein these groups are mutually staggered on the feed side such that picked up products from the row remote from the second conveyor belt cannot come into contact with products in the other row.

It will be apparent that the above described droplet-shaped path with specific speeds at the location of the two conveyor belts must in preference be realized with the simplest means. The apparatus must nevertheless operate wholly reliably and disturbance-free in all conditions. In this respect a preferred embodiment of the invention can have the feature that the drive means comprise at least two identical drive devices engaging on the pick-up means at a mutual distance in the lengthwise direction of the first conveyor belt and driven at equal phase by the motor means, each of which drive devices comprises:

a wheel driven rotatably around a fixed vertical axis;

a first arm connected pivotally thereto which pivotally supports the pick-up means; and a second arm pivotally connected to this first arm and pivotable at its free end around a fixed axis.

A very simple embodiment with an automatic synchronization between the energizing of the pick-up means and the phase of a cycle is obtained with an embodiment in which a valve is arranged between the source of underpressure and the pick-up means, the drive means comprise one motor and this motor also serves to control the valve synchronously with the pick-up means between an open position in which the products can be gripped by suction and a closed position.

Since the pick-up means are subject to great accelerations when following the droplet-shaped path a proportionally large motor power is necessary for the driving. The motor must be designed for the greatest accelerations. According to the invention however a considerably smaller motor power can suffice using an embodiment in which the drive means comprise flywheel means.

The invention will now be elucidated with reference to the annexed drawing, in which:

FIG. 3 shows a bottom view of a suction sole.

Figure 1:
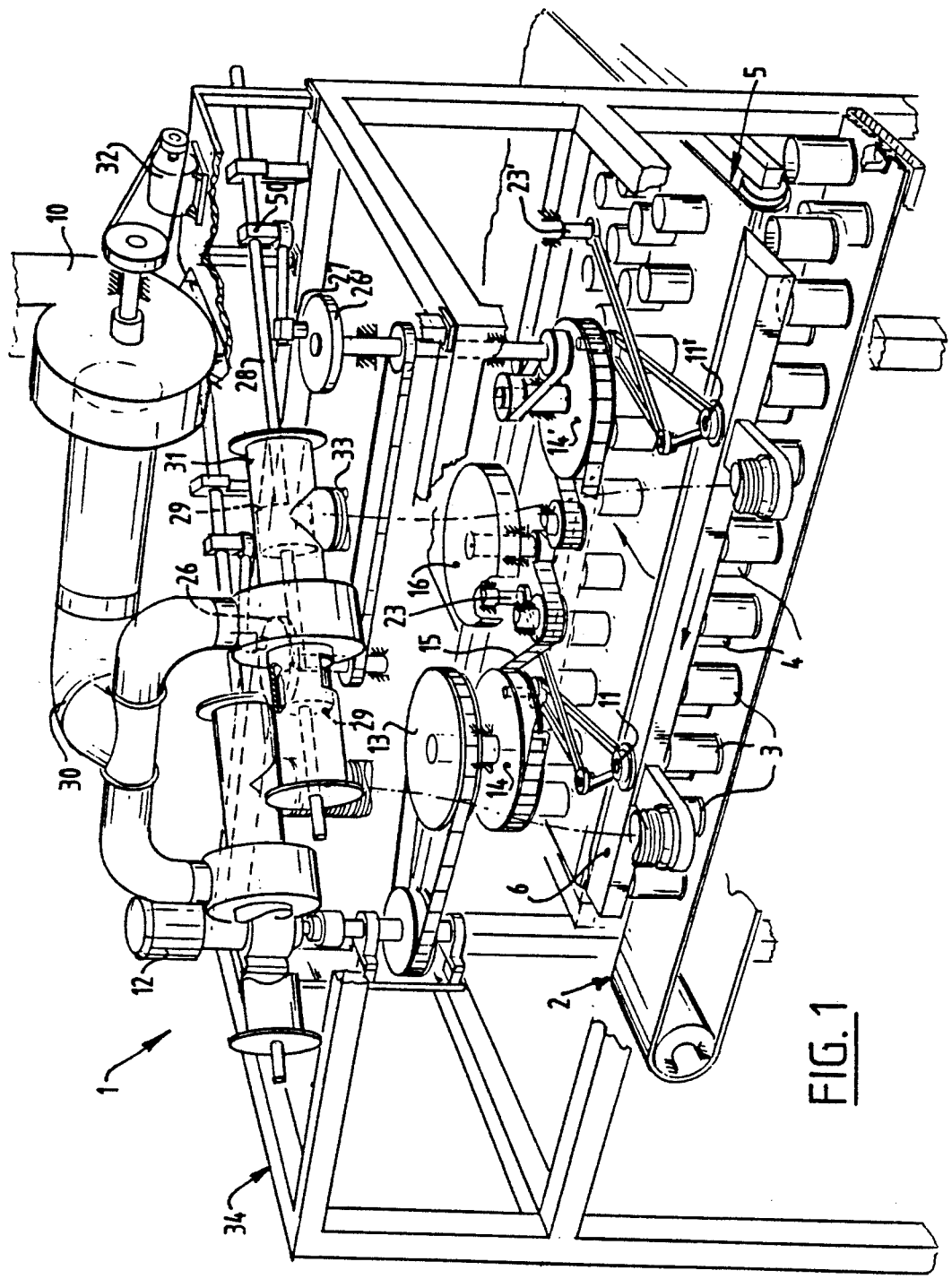
FIG. 1 shows a partly broken away perspective view of an apparatus according to the invention.

FIG. 1 shows an apparatus 1 according to the invention. This comprises a first conveyor belt 2 for supplying metal cans in two rows. The cans in the first row are designated with 3; those in the second row with 4. The cans are closed at the bottom and open at the top and are cylindrical in this embodiment. The first conveyor belt 2 is driven at a predetermined speed using drive means (not drawn).

The apparatus 1 to be described hereinbelow transfers the cans 3, 4 from the first conveyor belt 2 to a second conveyor belt 5 extending in transverse direction thereof which is moved by drive means (not drawn) considerably more slowly than the first conveyor belt 2 and has a correspondingly greater width for this speed. This conveyor belt 5 can for instance be a steel conveyor mat for carrying lacquered, still wet cans through a drying oven.

The rows of cans 3, 4 are picked up simultaneously from the first conveyor belt 2 in groups of for example nine cans by means of a suction beam 6. As shown in FIG. 3, this suction beam 6 comprises a sole 7 which is selectively connectable to a suction pump 10 via two rows of slotted holes 8, 9 respectively. In the position shown in FIG. 1 the sole 7 is situated above two groups of cans 3, 4 for picking up. The distance of the sole 7 from the upper rim of these cans 3, 4 is small such that when the slotted holes 8, 9 are brought into communication with the suction pump 10 in the manner to be described hereinafter the relevant cans 3, 4 are drawn by underpressure against the sole. The suction beam 6, which is supported by drive means to be described hereinafter, transports the picked up groups of cans 3, 4 via a specific path to the second conveyor belt 5 where the connection between the slotted holes 8, 9 and the suction pump 10 is broken and the cans thus deposited onto the second conveyor belt.

The suction beam 6 is only movable in a horizontal plane. The conveyor belts 2 and 5 lie with their active upper parts in a common horizontal plane.

The suction beam 6 is supported via two pivots 11 and 11'. These pivots each form part of a drive device, which two drive devices are identical. The drive devices (which will be described below) always displace the suction beam parallel to itself over the longitudinal distance in the direction of the conveyor belt 2 between the pivots 11 and 11'.

Figure 2:
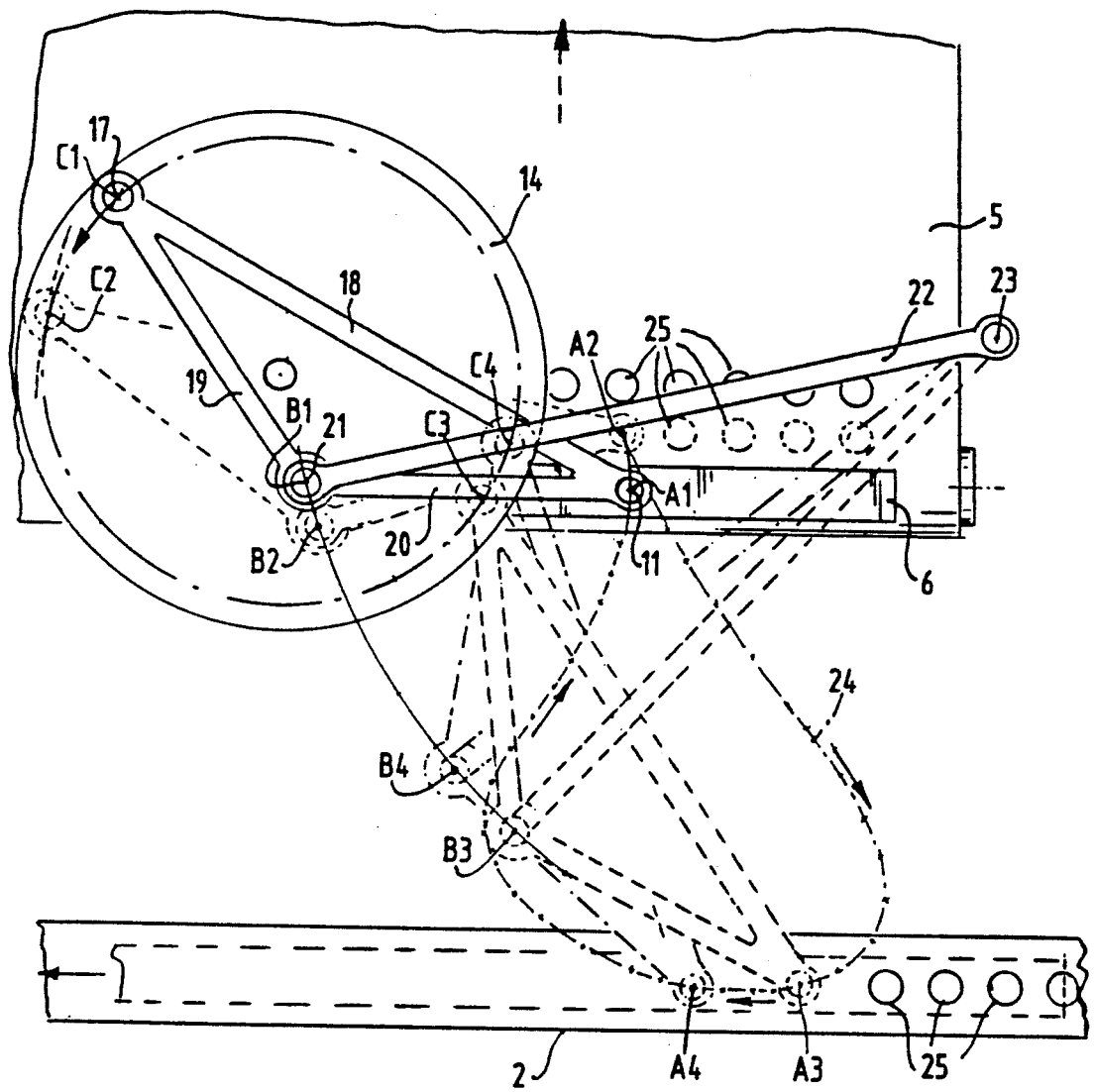
FIG. 2 shows a schematic top view of one drive device for the pick-up means in a number of phases of a cycle.

For a good understanding of the operation of each of both drive devices reference is now made to FIG. 2.

The whole apparatus 1, with the exception of the suction pump 10, is driven by a motor 12. This drives a gear wheel 13 via a transmission. Rigidly coupled to this wheel 13 is a wheel 14. Via a geared belt 15 this wheel 14 drives a flywheel 16 in addition to the wheel 14' forming part of the second drive device. Use is made for driving the flywheel of a pneumatic coupling. A gradual start can be achieved herewith, and protection in the case of an emergency stop. This second drive device is identical to the first. Therefore only the first drive device will be discussed.

The driven wheel 14 carries on its periphery a pivot 17. By means of a straight rod 18 and two rods 19, 20 forming a mutual angle, the pivot 17 is connected to the pivot 11 which is one of the two pivots supporting the suction beam 6. Situated at the transition between the rods 19 and 20 is a pivot 21 to which is connected a rod 22, whereof the end remote from the pivot 21 is pivotable around a fixed pivot 23. With this rod construction is achieved that the path of the pivot 11, and therewith also the path of the suction beam 6, has the form designated with 24. A correct choice of the speed of the first conveyor belt 2 and the drive speed of the wheel 14 can result in the speed of the suction beam 6 being substantially equal to the speed of the first conveyor belt 2 and having the same direction at the moment the cans 3, 4 are picked up. Achieved in the same manner is that, when the cans 25 (which in the embodiment according to FIG. 2 are supplied in only one row) are deposited onto the second conveyor belt 5, the speed of the suction beam 6 is practically zero, that is, substantially equal to the speed of the relatively very slow moving conveyor belt 5. This is the tiplike zone of the path 24 shown in FIG. 2 in which the speed of the suction beam 6 is reduced to zero and reverses direction.

For the sake of the clarity of the operation of the drive device this is shown in different phases of a cycle. The position of the pivot 11 is designated respectively with $A^1$, $A^2$, $A^3$, $A^4$. The position of the pivot 21 is designated correspondingly with respectively $B^1$, $B^2$, $B^3$, $B^4$. The position of the pivot 17 is designated respectively with $C^1$, $C^2$, $C^3$, $C^4$.

It is essential that the suction beam 6 is coupled to the suction pump 10 at the correct moment for suction of the cans 3, 4 and again decoupled for depositing the cans 3, 4. For this purpose two wheels 26, 26' are connected to wheel 14' which drive a piston rod 28 reciprocally via an eccentric pin 27. The suction pump 10 driven by a motor 32 is connected to a suction conduit 30 which branches to two identical controllable valve systems, only one of which will be discussed. A cylinder 31, in which the piston 29 is reciprocally movable, is connected to the suction conduit 30 and connects to a flexible, second suction conduit 33 which is connected to the suction beam 6 and communicates with the slotted holes 8, 9. The piston 29 is movable in the manner described between two positions. In the one position the connection between the suction conduits 30 and 33 is blocked and no suction of products takes place, while in the other position the suction conduit 30 communicates with suction conduit 33 and products can be gripped by suction.

The switch point suction ON - suction OFF is adjustable; the disc 26 is lockable in a desired angular position relative to the shaft to which it is fixed. The block 50 can be locked in a desired position on the rod 28. With these two adjustments suction ON - suction OFF can be selected individually.

As a result of the positive coupling between the action of the said drive devices and the corresponding control of the suctions an automatically operating synchronization takes place which cannot be disturbed by ageing.

The said fixed positions, in particular those of the drive motor 12, the wheels 14, 14' and the pivots 23, 23', are related to a frame 34, by means of which the apparatus 1 occupies a fixed position.

FIG. 3 shows that the rows of slotted holes 8, 9 are preferably staggered at their infeed side. Thus prevented is that products picked up from the row located to the outside can knock over products from the row located to the inside. At the ends the last slotted holes 35, 36 have curved slotted holes 37 which have the same radius of curvature as the cans 3, 4. A high level of pick-up reliability is hereby ensured.

We claim:

1. An apapratus for moving objects from a first conveyor belt traveling at a first speed in a first direction, to a second conveyor belt traveling at a second speed in a second direction, comprising:
 a pick-up device for engaging the objects while the objects are positioned on the first conveyor belt traveling at the first speed in the first direction, and lifting the objects from the first conveyor belt; and
 a drive connected to the pick-up device for transferring the objects to the second conveyor belt traveling in the second direction at the second speed;
 the pick-up device including a first activated position for gripping the objects at the first conveyor belt, and a second activated position for depositing the objects onto the second conveyor belt;
 the drive including a drive accelerator for varying the speed of the pick-up device between the first speed at the first conveyor belt and the second speed at the second conveyor belt;
 the drive further including a pivoting device for varying the direction of the pick-up device betwen the first direction and the second direction; and
 the pivoting device including a wheel rotatably mounted to a first fixed vertical shaft, a first arm pivotally connected to the wheel and to the pick-up device, and a second arm pivotally connected to the first arm and to a second fixed vertical shaft.

2. The apparatus of claim 1, wherein the pick-up device comprises:
 a sole with at least one opening;
 a source of suction pressure connected to the sole and communicating with the opening in the sole; and
 a control device for activating the suction pressure when the pick-up device is above the first conveyor belt, maintaining the suction pressure during transfer of the pick-up device to the locatio above the second conveyor belt, and terminating the suction pressure when the pick-up device is above the second conveyor belt.

3. The apparatus of claim 2, wherein the control device comprises a cylinder valve with a piston positioned therein, the cylinder valve communicating with both the source of suction pressure and the opening in the sole, the piston movable between a first position which allows communication between the source of suction pressure and the opening in the sole, and a second position which blocks communication between the source of suction pressure and the opening in the sole.

4. The apparatus of claim 1, comprising two identical drives connected to the pick-up device at spaced locations and driven by a single motor, the first drive coupled to the second drive and the motor using one or more geared belts engaging the first drive, the second drive, and the motor.

5. The apparatus of claim 1, wherein the drive accelerator comprises an acceleration motor.

6. The apparatus of claim 2, wherein the sole comprises a plurality of openings.

7. The apparatus of claim 2, wherein at least one opening in the sole is a slot.

8. An apparatus for moving objects from a first conveyor belt traveling at a first speed in a first direction, to a second conveyor belt traveling at a second speed in a second direction perpendicular to the first direction, comprising:
 a pick-up device for engaging a row of objects positioned on the first conveyor belt traveling at the first speed in the first direction, and lifting the row of objects from the first conveyor belt; and
 two drives connected to the pick-up device at longitudinally spaced locations for transferring the row of objects to the second conveyor belt traveling in the second direction at the second speed;
 the pick-up device including a first activated position for gripping the row of objects at the first conveyor belt, and a second activated position for depositing the row of objects onto the secnod conveyor belt;
 each of the two drives including a drive wheel rotatably mounted to a first fixed vertical shaft, a first arm pivotally connected to the drive wheel and to the pick-up device, and a second arm pivotally connected to the first arm and to a second fixed vertical shaft;
 the apparatus further comprising a flywheel rotatably mounted between the two drives and coupled to the two drive wheels using a first belt which engages the flywheel and the drive wheels of both drives; and
 a drive motor which is coupled to the drives using a second belt which engages the drive motor and one of the drives.

9. The apparatus of claim 8, wherein the pick-up device comprises:
 a sole having a plurality of openings;
 a source of suction pressure connected to the sole and communicating with the opening in the sole; and
 a control device for activating the suction pressure when the pick-up device is above the first conveyor belt, maintaining the suction pressure during transfer of the pick-up device to the location above the second conveyor belt, and terminating the suction pressure when the pick-up device is above the second conveyor belt.

10. The apparatus of claim 9, wherein the plurality of openings comprises a plurality of slotted openings.

11. The apparatus of claim 8, wherein the two drives interact with the pick-up device such that the pick-up device travels in a droplet-shaped path between the first conveyor belt and the second conveyor belt.

* * * * *

UNITED STATES PATENT AND TRADEMARK OFFICE
CERTIFICATE OF CORRECTION

PATENT NO. : 5,311,978
DATED : May 17, 1994
INVENTOR(S) : Frits Kroon et al.

It is certified that error appears in the above-indentified patent and that said Letters Patent is hereby corrected as shown below:

In column 1, line 17, delete "beakershaped" and insert --beaker-shaped--.

Col. 5, claim 1, line 24, delete "betwen" and insert --between--.

Col. 5, claim 2, line 39, delete "locatio" and insert --location--.

Col. 6, claim 8, line 23, delete "secnod" and insert --second--.

Signed and Sealed this

Twenty-seventh Day of September, 1994

Attest:

BRUCE LEHMAN

Attesting Officer

Commissioner of Patents and Trademarks